(12) United States Patent
Kram et al.

(10) Patent No.: US 11,044,252 B2
(45) Date of Patent: Jun. 22, 2021

(54) TECHNIQUES FOR SECURED PARTITIONING OF AN OPTICAL TRANSMISSION SYSTEM TO PROVIDE MULTI-CLIENT MANAGEMENT ACCESS AND A NETWORK MANAGEMENT SYSTEM IMPLEMENTING SAME

(71) Applicant: SUBCOM, LLC, Eatontown, NJ (US)

(72) Inventors: Richard Kram, Ocean, NJ (US); Jonathan M. Liss, Marlboro, NJ (US); Sushil Prabhu, Ocean, NJ (US); Antonio Ciorri, Ocean Township, NJ (US); Eric Bodner, Tinton Falls, NJ (US); Shreya Gautam, Red Bank, NJ (US)

(73) Assignee: SubCom, LLC, Eatontown, NJ (US)

( * ) Notice: Subject to any disclaimer, the term of this patent is extended or adjusted under 35 U.S.C. 154(b) by 352 days.

(21) Appl. No.: 16/129,787

(22) Filed: Sep. 12, 2018

(65) Prior Publication Data
US 2020/0084209 A1 Mar. 12, 2020

(51) Int. Cl.
*H04L 29/06* (2006.01)
*H04B 10/27* (2013.01)

(52) U.S. Cl.
CPC ......... *H04L 63/0876* (2013.01); *H04B 10/27* (2013.01); *H04L 63/0853* (2013.01); *H04L 63/0892* (2013.01); *H04L 63/102* (2013.01)

(58) Field of Classification Search
CPC ....... G06F 3/0644; G06F 9/5077; H04L 67/42
See application file for complete search history.

(56) References Cited

U.S. PATENT DOCUMENTS

| 6,202,066 B1 * | 3/2001 | Barkley ............. G06F 21/6218 707/785 |
| 7,103,149 B1 | 9/2006 | Depaolantonio |

(Continued)

FOREIGN PATENT DOCUMENTS

WO 200062575 11/2017

OTHER PUBLICATIONS

European Search Report dated Jan. 17, 2020 for European Patent Application No. 19197087.0.

*Primary Examiner* — Jason K Gee
(74) *Attorney, Agent, or Firm* — Kacvinsky Daisak Bluni PLLC (57) ABSTRACT

A system and method consistent with the present disclosure allows for a single NMS system to manage data access and control for N number of customer domains and associated users. In particular, an NMS consistent with the present disclosure may include a configuration that partitions the optical communication system by domain. For each domain, partitioning can further define per-user access constraints and privileges including access to specific equipment by, for instance, fiber pair designation, wavelength designation, specifically identified hardware elements, component categories, or any combination thereof. The NMS system may utilize a proxy server approach to authentication, e.g., using RADIUS, that allows for each party/customer to maintain separate authentication databases and equipment-specific constraints. The NMS may therefore validate users and enforce domain restrictions via the partitioning information such that each user has a secure 'view' of only those portions of the system associated with their particular domain.

18 Claims, 6 Drawing Sheets

(56) References Cited

U.S. PATENT DOCUMENTS

| | | |
|---|---|---|
| 9,769,097 B2 | 9/2017 | Gatt |
| 2010/0198972 A1* | 8/2010 | Umbehocker ........ G06F 9/5016 709/226 |
| 2010/0242092 A1* | 9/2010 | Harris .................... G06F 21/53 726/3 |
| 2014/0282928 A1* | 9/2014 | Morales .............. H04W 12/003 726/5 |
| 2017/0149650 A1* | 5/2017 | Tsaltskan ............... H04B 10/25 |
| 2017/0331791 A1 | 11/2017 | Wardell et al. |

* cited by examiner

```
<System>                                            300
<SystemName>MyCableSystem</SystemName>
<Stations>5</Stations>
<FiberPairs>6</FiberPairs>
<NumberCustomers>3</NumberCustomers>
<Customer Name="AcmeCable">
    <Domain>acmecable.com</Domain>
    <SecurityIP>18.8.9.8</SecurityIP>
    <WetPlant>
        <WPData>
            <NE>WSSROADM</NE>
            <Cable>1</Cable>
            <NEID>3</NEID>
            <ADMAccess>1,2</ADMAccess>
        </WPData>
    </WetPlant>
    <Station Name="NYC">
        <FPAccess>1</FPAccess>
        <GlobalAccess>Unrestricted</GlobalAccess>
        <NEData>
            <NE>PFEG4</NE>
            <Cable>1</Cable>
            <NEID>1</NEID>
            <Access>Unrestricted</Access>
        </NEData>
        <NEData>
            <NE>LMEG4</NE>
            <NEID>1</NEID>
            <Access>Restricted</Access>
        </NEData>
    </Station>
     <Station Name="London">
     ...
    </Station>
```

TECHNIQUES FOR SECURED PARTITIONING OF AN OPTICAL TRANSMISSION SYSTEM TO PROVIDE MULTI-CLIENT MANAGEMENT ACCESS AND A NETWORK MANAGEMENT SYSTEM IMPLEMENTING SAME

TECHNICAL FIELD

The present application generally relates to communication systems and, more particularly, to techniques for logically partitioning an optical transmission system to provide a single point of access for multiple client/customers which enables a per-client "view" of the optical transmission system that reflects a given client's authorized equipment and privileges based on the user's corresponding domain.

BACKGROUND

Network management may be conducted at different levels in various types of optical networks to avoid network failures and to assure network performance. In a communication network, an element management system (EMS) may be used to supervise and manage network elements within a network. A communication network may also include a network management system (NMS) to manage the overall network by communicating with several EMSs.

In an optical communication system such as a wavelength division multiplexed (WDM) system, for example, terminal or cable stations may be interconnected by cable segments to form a network. The network elements in an optical communication system may include equipment located at a cable station (e.g., terminal equipment and power feed equipment, computers, phones, printers and so on) as well as equipment associated with the cable station (e.g., adjacent repeaters, branching units and equalizers). In such a system, an EMS may be located at a cable station (or at a separate location) and used to manage the network elements associated with this cable station. The EMS may include one or more servers for performing the element management functions and one or more workstations for providing a user interface (e.g., to display the information associated with the network elements managed by the EMS). An NMS may be located at one of the cable stations or at a separate location for managing the overall optical communication system or network.

Optical communication systems in the subsea context are often owned and operated by consortiums of multiple parties, some or all of which desire complete data and operational independence for managing their part of the overall communication system. Previous approaches for supporting this access includes providing dedicated Element Management Systems (EMSs) and Network Management System (NMSs) hardware and software for each party, possibly in addition to separate server equipment for the common part of the system that all parties could access such as power feed equipment (PFEs). The dedicated EMS and NMS hardware and software ensures that each party can manage only their specific portions of an optical communication system as well as commonly owned equipment, as well as the ability to manage user logins and privilege levels for the equipment at a fine-grain level. However, providing dedicated EMS and NMS systems raise numerous technical challenges and can significantly increase costs related to hardware, software licensing, and technicians to maintain duplicate systems.

BRIEF DESCRIPTION OF THE DRAWINGS

Reference should be made to the following detailed description which should be read in conjunction with the following figures, wherein like numerals represent like parts.

DETAILED DESCRIPTION

As discussed above, providing dedicated NMS server systems to permit multi-party NMS data access and control is a relatively inefficient use of hardware as each customer is given, essentially, duplicate hardware to manage login credentials, equipment privileges, and to handle requests to perform system operations and collect diagnostic data from network elements. While a single set of network management hardware and software remedies these inefficiencies in theory, the implementation of such as system raises technical complications due to the nature of optical communication systems whereby some equipment may be specific to a particular customer, while other equipment may be commonly owned.

These multi-party challenges may be better understood by way of a simplified example. Consider a four fiber pair cable system that may be owned by a consortium of four different parties each owning a different fiber pair of the four fiber pairs and associated Line Terminating Equipment (LTE). Some LTE may be common equipment owned by all parties such as Power Feed Equipment (PFE) that provides power along the fiber optic cable. Further, some common equipment such as Line Monitoring Equipment (LME) may be commonly owned, but may store data on a per-fiber pair basis. In this example, each party may desire access to the LME equipment for operational purposes, but may also desire that data specific to their fiber pairs be private and inaccessible to other parties in the system. Moreover, each party may desire to have fine-grain control over their specific user logins without other parties having the ability to "see" the user login data tables and security privileges.

Thus, the present disclosure is generally directed an approach that allows for a single NMS system to manage data access and control for N number of customer domains (or simply domains) and associated users. In particular, an NMS consistent with the present disclosure may include a scheme/configuration that logically partitions the optical communication system by domain. For each domain, partitioning can further define per-user access constraints and privileges including access to specific equipment by, for instance, fiber pair designation, wavelength designation, specifically identified hardware elements, component categories (e.g., repeaters, OADMS, PFEs, etc.) or any combination thereof. The NMS system may utilize a proxy server approach to authentication, e.g., using Remote Authentication Dial In User Service (RADIUS) or other suitable approach, that allows for each party/customer to maintain separate authentication databases that can establish user logins, access privileges, and equipment-specific constraints. The NMS may therefore validate users via the proxy server, and enforce domain restrictions via the partitioning information such that each user has a secure 'view' of the optical communication system that includes only those portions of the system associated with their particular domain. Users may access the NMS directly via a graphical user interface (GUI) or indirectly via, for instance, a Representational State Transfer (ReST) based Application Programming Interface (API) for remote Operations System Support (OSS) programmed management.

Therefore, users can have access to their respective portions of the system, including commonly owned elements, based on a secure, transparent partitioning scheme provided by the NMS that can provide fine-grain access to equipment based on a particular fiber cable, fiber pair(s), and/or channel wavelengths associated with a given domain. Moreover, an NMS consistent with the present disclosure allows for each domain to remotely host their own user credentials database in separate third-party server, which can increase isolation between system elements and the remote third-party servers for the purposes of data security and ease of management. Thus, the overall number of server components may be reduced relative to approaches that provide a dedicated NMS and/or EMS server system for each party desiring to access the system, and in some cases server processes consistent with the present disclosure can be hosted via public or private Cloud services. Numerous benefits of this reduction of hardware and server components/functions will be apparent in view of this disclosure and include, for instance, decreased complexity for installs and maintenance, increased rack/server room space for other equipment, fewer technicians to train, and greater flexibility in providing and administering API and GUI access to NMS server functionality.

Figure 1:
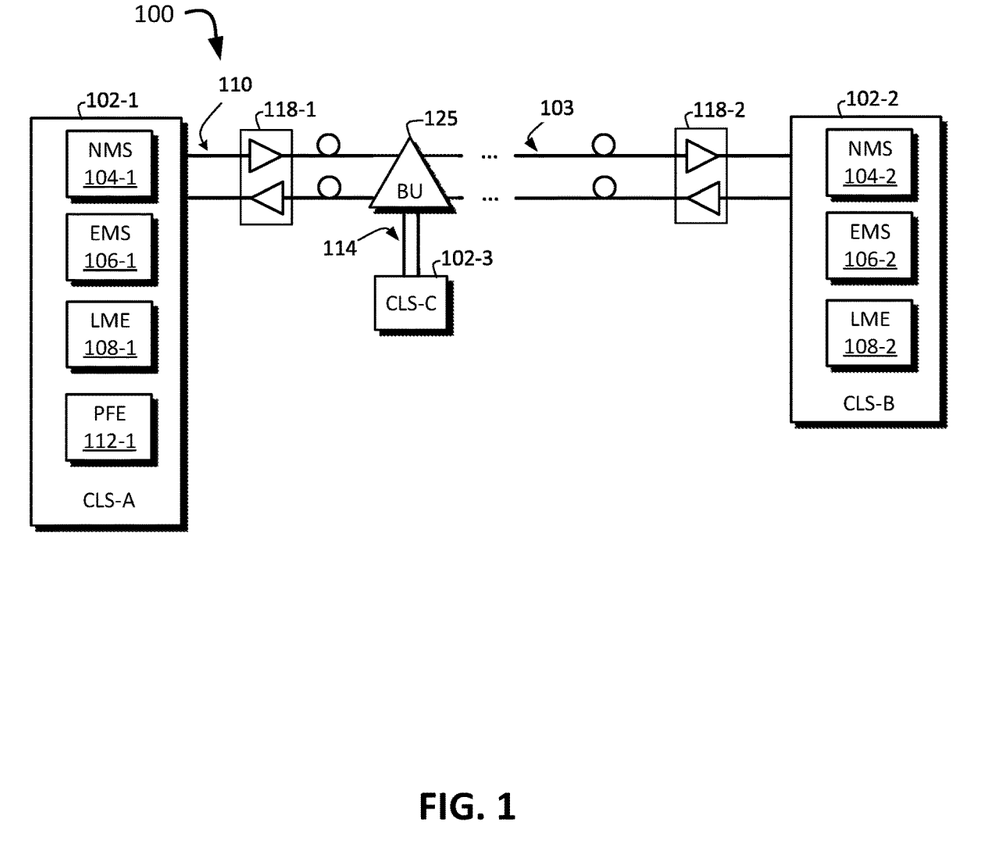
FIG. 1 is a simplified block diagram of one exemplary embodiment of an optical system consistent with the present disclosure.

Turning to the Figures, FIG. 1 shows an optical communication system 100 consistent with the present disclosure. The optical communication system 100 is shown in a highly simplified form for ease of description and not by limitation. The optical communication system 100 may be implemented as a subsea optical communication system wherein at least a portion of the elements are located below sea level. Further, the optical communication system 100 may be implemented as a wavelength division multiplexing (WDM) system capable of transmitting via a plurality of channel wavelengths. As shown, the optical communication system 100 includes an optical transmission path 103 that extends between a plurality of cable landing stations, namely cable landing stations 102-1, 102-2 and 102-3.

As shown, the optical communication 100 includes an optical fiber cable collectively shown as 110 that spans a relatively large geographic distance (e.g., tens, hundreds, or thousands of kilometers). The undersea optical network may thus comprise a plurality of "wet" optical components that are disposed along the sea floor or disposed on a sea-based platform, for example. However, cable segments are not necessarily limited in this regard and the optical communication system 100 may include, at least in part, some lengths of land-based optical fiber segments. Although examples and scenarios disclosed herein refer to cable landing stations or CLSs, the disclosure is not necessarily limited in this regard. For example, the techniques disclosed herein are equally applicable to any station located within the optical communication system including, for example, Network Operation Centers (NOCs) and Remote Operation Positions (ROPs), just to name a few.

Continuing on, the optical transmission path 103 includes at least one optical cable 110 comprising one or more optical fiber pairs. The optical transmission path 103 includes a plurality of optical components including repeaters 118-1, 118-2, and one or more branching units, e.g., BU 125. The BUs can include reprogrammable optical add/drop multiplexers (ROADMs) or other suitable optical filters/components (e.g., that can include circuitry for remote monitoring and control) for sending and receiving channel wavelengths from a branch path, e.g., branch path 114. Each cable landing station may include an Element Management System (EMS) for providing access to various optical components and for providing an interface to Command/Response Elements (CREs) within the system.

Each of the cable landing stations 102-1 to 102-3 may be disposed along a shore or on a platform. Each of the cable landing stations 102-1 to 102-3 may include line terminating equipment (LTE) such as channel line cards (not shown), power feed equipment (PFE) 112-1, and so on. The PFE 112-1 may be configured to provide a constant voltage or constant current along the optical transmission path 103.

As further shown, the first cable landing stations 102-1 includes an NMS 104-1, EMS 106-1 and LME 108-1. The NMS 104-1 may be implemented as the NMS 204 discussed in further detail with reference to FIG. 2. Each NMS may be configured to communicate with N number of EMS systems. Each of the EMS systems may be configured to communicate with optical components such as repeaters and other elements local or otherwise adjacent to a given cable landing station. LME equipment may be utilized to perform high loss loopback (HLLB) or other measurements to ensure nominal performance and to detect faults, e.g., cable breaks, along the optical transmission path 103.

Optionally, more than one cable landing station may include similar components for redundancy and fault tolerance, and for local administration of network elements. For example, the second cable landing station 102-2 can include NMS 104-2, EMS 106-2 and LME 108-2. As discussed further below, each of the NMS components 104-1, 104-2, may collectively form a single NMS system 204 whereby users can log into any NMS component, e.g., directly via a graphical user interface (GUI), or via an API, and have requests serviced. In this example, one of the NMS components may operate as a master whereby the slave NMS systems proxy or otherwise forward requests to the master for handling. In the event the master NMS goes offline, the optical communication system 100 may be configured to automatically switch a slave NMS into the master role.

Figure 2:
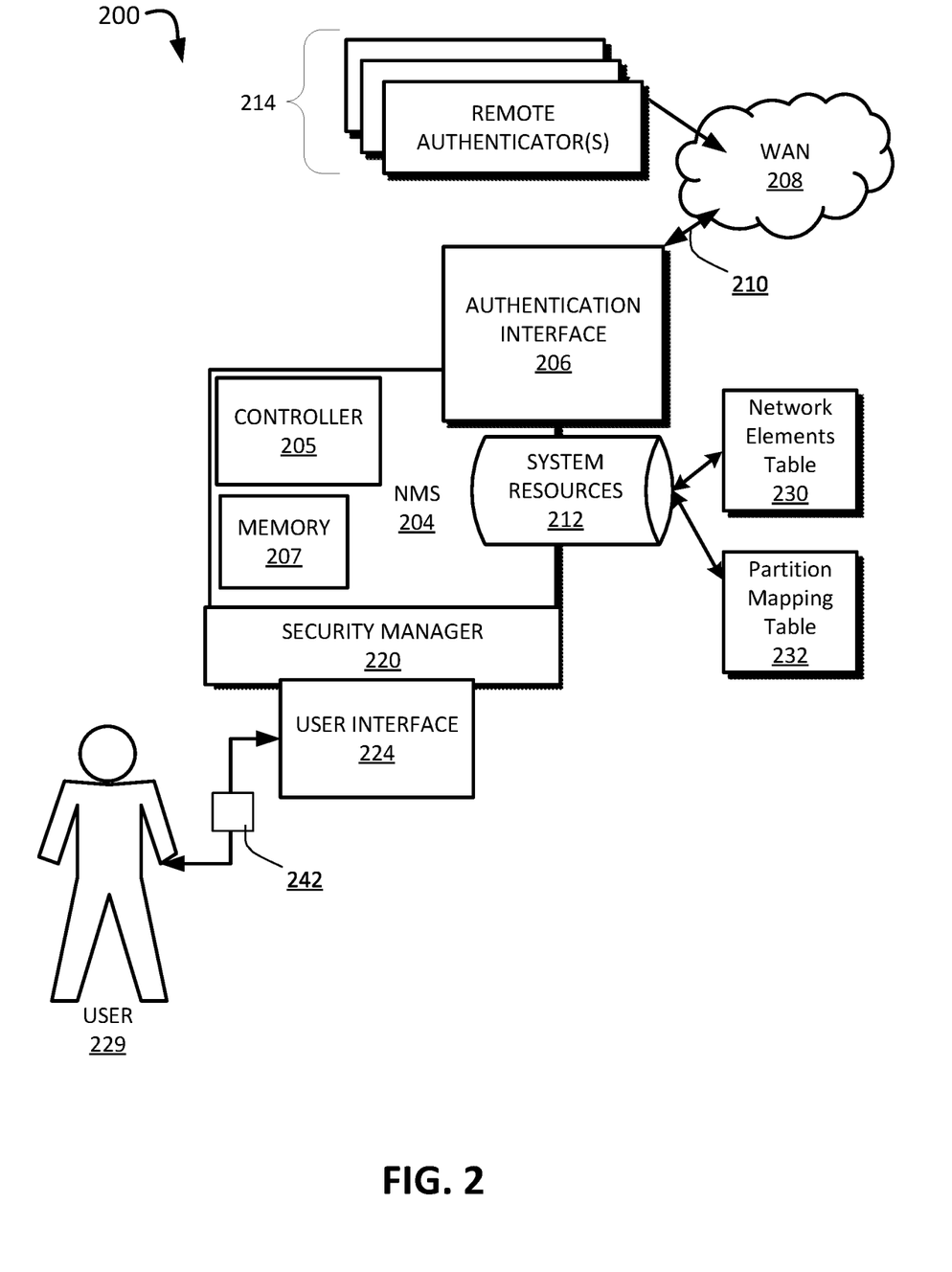
FIG. 2 simplified block diagram of an exemplary embodiment a network management system (NMS) suitable for use in the optical communication system of FIG. 1.

FIG. 2 shows an example network management system (NMS) architecture 200 consistent with the present disclosure. The NMS architecture 200 is depicted in a highly simplified form for clarity and not limitation. The NMS architecture 200 may be implemented in different configurations including, for instance, a plurality of NMS servers, EMS servers, LME, and so on, to collectively provide the NMS architecture 200. In this way, components may be distributed among multiple cable landing stations, e.g., CLS 102-1 . . . CLS 102-3 of FIG. 1, to provide redundancy, fault tolerance and to provide multiple points of access for users of the NMS architecture 200. The NMS 204 may be therefore collectively be implemented as a single NMS server, e.g., NMS 104-1, or may comprise a plurality of NMS systems as shown in FIG. 1, e.g., NMS 104-1, 104-2.

As further shown, the NMS 204 includes a plurality of associated components including a an authentication interface 206, a system resources database 212, a security manager 220, and a user interface 224. The NMS 204 may be implemented in hardware (e.g., circuitry), software, public/private cloud, or a combination thereof. In an embodiment, the NMS 204 may be implemented at least in part as a plurality of non-transitory instructions stored in memory 207 that may be executed by a controller 205 (which may also be referred to as an NMS controller) to carry out the NMS processes, e.g., processes 500 and 600 of FIGS. 5 and 6, respectively. A controller, as generally referred to herein, may be implemented as a processor (e.g., x86 process or a virtual computer), field programmable gate array (FPGA), an application-specific integrated circuit (ASIC), or any other suitable processing device/circuitry.

The user interface 224 may comprise graphical user interface (GUI) components and/or API components to receive and process requests from a user, e.g., user 229. In an embodiment, the API of the user interface may implement a ReST architecture. The security manager 220 may be configured to ensure that requests received from a user are permissible based on the user's associated privileges and access rights. To perform authentication and validation of user rights when servicing requests from a user, the security manager 220 may utilize the authentication interface 206. The authentication interface 206, which may also be referred to as a proxy authentication interface, can communicate with a remote authenticator(s) 214 by way of a wide area network 208, e.g., the Internet.

Each the remote authenticator 214 may correspond with a different customer domain and be configured to service authentication requests from the authentication interface 206. As discussed in further detail below, the authentication data in each remote authenticator may be stored in a standardized way, e.g., using a predefined schema, to allow each entity to provision their respective databases in a manner that comports with requirements of the NMS 204. Thus, the security manager 220 may transparently select a particular remote authenticator 214 based on a known association (e.g., stored in the memory 207) between the user 229 and their respective entity/domain. Alternatively, the user 229 may include an entity/customer identifier when communicating with the NMS 204 that allows the same to select an appropriate remote authenticator. In this case, the security manager 220 may then select a remote authenticator 214 based on the identified entity and communicate with the identified entities' remote authenticator for validation and authentication purposes. Note while the embodiment of FIG. 2 includes communication with a remote authenticator, this disclosure is not limited in this regard. For instance, the NMS 204 may utilize a local database for authentication purposes and may use the local database to authenticate users, or may both locally authenticate some users while using remote authenticators to authorize others depending on a desired configuration.

In addition to providing authentication data, each remote authenticator may further define access attributes for each user. As discussed in greater detail below with reference to Table 1, access attributes may define what equipment within the optical communication system 1 a user has access to by, for instance, defining a particular category/type of equipment a user may access and their rights and access privileges for that equipment type. The security manager 220 then allows or disallows requests to equipment from the user 229 based on their access attributes and the partition mapping table, which is discussed in further detail below.

The NMS 204 can include a system resources database 212 stored in the memory 207. The system resource database 212 may be distributed among a plurality of components including multiple NMSs and EMSs, for instance, and the embodiment shown in FIG. 2 is not intended to be limiting. For example, each cable landing station may include an EMS that stores data representative of each associated optical component including, for instance, line cards, PFEs, repeaters, LMEs, equalizers, computer servers, and branching units. The NMS 204 may then utilize the EMS data from each of the cable landing stations to collectively and logically form the network elements table 230, although the data may be physically distributed among different cable landing stations. The system resources database 212 can include structured query language (SQL) databases, flat files (e.g., unique universal markup language (XML)), in-memory data structures, or any combination thereof.

Continuing on, the partition mapping table 232 may be utilized to associate network elements from the network elements table 230 with customer domains/entities. For instance, the partition mapping table 232 may include a hierarchal structure that associates domains (which may be referred to as a customer ID), with cable landing stations. The partition mapping may then further define associations down to the equipment level, fiber optical cable, fiber pair(s), and/or one or more target wavelengths. As described further below with reference to FIG. 3, the partition mapping table 232 may include one or more definitions that manifest as an XML document, although other types of file formats are within the scope of this disclosure. The NMS 204 may then utilize entries to allow user access to equipment/elements within the system 100 based on, for instance, a corresponding entry in the network elements table that associates equipment with its respective cable station, fiber optic cable(s), fiber pair(s), and/or channel wavelength(s).

Note that each customer domain may be associated with different cable landing stations, or two or more customer domains may be associated with one or more common cable landing stations. The secured partitioning scheme disclosed herein advantageously allows for such mixed domains by enabling fine-grain control over what specific elements a domain has access to down to the channel wavelength-level, depending on a desired configuration.

Thus, in operation, the NMS 204 can receive requests from the user 229 and authenticate the user 229 via a remote authenticator and to receive access attributes associated with the user. The NMS 204 may then service requests from the user 229 and validate the requests based on the access attributes and the system resources database 212. In particular, the customer ID (or domain ID) associated with the user 229 may be used to determine what equipment is authorized based on one or more entries in the partition mapping table 232 as discussed above.

By way of example, consider a scenario where the user 229 requests log data for a first repeater R1 on a first fiber pair (P1) via the user interface 224. In this example, the NMS 204, by way of the security manager 220, may determine if the request should be serviced by examining the access attributes for the user 229, the network elements table 230, and the partition mapping table 232. If the first repeater R1 is associated with the user's customer domain, e.g., based on an entry in the partition mapping table 232 that associates the user's customer domain with the first fiber pair P1 and a corresponding entry in the network elements table 230 that associates the first repeater (R1) with the first fiber pair P1, the request may then be serviced by the NMS 204 by communicating with the repeater R1 or the EMS responsible for the repeater R1. Note, the data retrieved from the repeater R1 by the NMS 204 may be limited to only that data corresponding to the first fiber pair although repeater R1 may be associated with multiple fiber pairs.

In an embodiment, the NMS 204 may be configured to provide topology information to the user 229 based on a request from the same. The topology information may include data that represents the network elements the user 229 has access to. In an embodiment, the topology information is derived from the network element table 230 and the partition mapping table 232.

The topology information may than be utilized by a GUI of a computing device, e.g., smart phone, laptop, tablet, of the user 229 to visually present what particular elements the user 229 has access to. In some cases, the topology information may be implemented as a Common Object Request Broker Architecture (CORBA) message that can be utilized by a user device to generate a dynamic user interface (See FIGS. 5 and 6). In turn, the user 229 may make requests to specific equipment via the NMS based on the visualized topology information. For instance, a map may be presented via a GUI of the computing device that allows a user to select an icon or other visual indicator that represents equipment disposed along the optical transmission path 103. The user 229 may then request diagnostic data, adjust settings, or otherwise post requests to their assigned network elements/equipment.

Authenticator Provisioning

Initial provisioning for the NMS 204 includes generating an authentication server configuration for each authenticator, e.g., remote authenticators 214. The authentication server configuration allows for an arbitrary number of independent entities per optical communication system in a manner that allows each user to authenticate against data stored on within their respective entity's authentication database. For instance, requests to access the NMS 204 may be handled transparently via the authentication interface 206 that communicates with a remote a remote authenticator 214 via a wide area network (WAN) 208, e.g., via the Internet. The communication 210 between the authentication interface 206 and the remote authenticator 214 may utilize a RADIUS authentication approach which can utilize an Authentication, Authorization, and Accounting (AAA) protocol. Note, other authentication systems may be utilized such as TACACS+ or Red Hat Identity Manager (IdM), just to name a few.

In any event, any number of remote authenticators may be utilized to allow for N different entities to utilize the NMS 204 and authenticate using their own server. The authentication proxy server 218 can determine which physical server or virtual instance to address (e.g., by domain) to retrieve authentication (e.g., login access) and authorization (e.g., access attribute) information.

In an embodiment, each authentication server of the remote authenticators 214 can be configured with a configuration that enables users to authenticate with the NMS 204 and obtain appropriate equipment access credentials. For each user, equipment access attributes, or simply access attributes, may be stored in a table, flat file, or other data store by an authentication server. In some cases, access attributes manifest as predefined definitions, and the predefined definitions being uniform across all authentication servers based on a common definition/specification. The access attributes may establish the category of equipment a given user is able to access. One example specification for access attribute definitions is shown in Table 1.

TABLE 1

| ATTRIBUTE | Code | Type |
| --- | --- | --- |
| TEMSUser | 0x1 | [Global Access] |
| WetPlantUser | 0x2 | [Global Access] |
| PFEUser | 0x3 | Limited Access |
| LMSUser | 0x4 | Limited Access |
| TLAUser | 0x5 | Limited Access |
| CREUser | 0x6 | Limited Access |
| sWMUUser | 0x7 | Limited Access |
| WSSROADMUser | 0x8 | Limited Access |
| #Special Restricted Attribute | | |
| RestrictedUser | 0x9 | Restricted |

As shown above, basic access attributes include three types of user access attributes. The first type includes Global Access Attributes such as: TEMSUser, WetPlantUser. A user assigned with the attribute TEMSUser can access any resource available to the NMS system 204. Likewise, a user assigned with the attribute WetPlantUser can access any wet plant network element available via the NMS system 204, e.g., repeaters, equalizers, undersea power conversion units, predetermined wavelength filtering units, and so on.

A second type includes limited access to a specific network element. In some cases, a user assigned to specific network element or group of elements. In the example definitions provided above, users assigned the PFEUser attribute has access to Power Feed Equipment (PFE); users assigned the LMSUser attribute has access to Line Monitoring System (LMS) devices; users assigned the Terminal Line Amplifier (TLA) attribute has access to TLA devices; users assigned the CREUser attribute have access to Command Response Equipment (CRE), users assigned the sWMUUser have access to Switched Wavelength Multiplexing Units (sWMUs), and users assigned the WSSROADMUser attribute have access to Wavelength Selectable Switched Reconfigurable Optical Add Drop Multiplexers (WSSROAMs). The code and type definitions define the unique ID for the attribute and the type represents the type of access the attribute grants as enumerated and discussed above.

A third type includes restricted access. Users assigned with the RestrictedUser attribute can be blocked from access equipment in a particular cable station but allow access potentially at another. Note the provided example attributes are not intended to be limiting, and moreover, do not represent an exhaustive list of equipment type and access control categories. Numerous other types of equipment and access categories/behaviors are within the scope of this disclosure.

Continuing on, additional attribute definitions may define the access rights for each of the access attributes discussed above with regard to table 1. One such example is provided in Table 2.

TABLE 2

| Attribute Value | Access Value | Code |
| --- | --- | --- |
| TEMSUser | View | 0x1 |
| TEMSUser | Control | 0x2 |
| TEMSUser | Admin | 0x3 |

Each user access attribute value can be assigned one of three access right possibilities, namely, view, control and admin. As shown above in Table 2, a user assigned the TEMSUser attribute may then further be assigned one of three access types: read-only via a View attribute, read-write via a Control attribute, and an admin-level for administration tasks beyond read-write such as firmware upgrades via the Admin attribute.

User entries may then be generated and assigned with attributes including a customer domain, a username, a password, global or specific system resource access (e.g., as discussed above with regard to Table 1), and access rights to the assigned resources (e.g., as discussed above with regard to Table 2). Therefore, users may be generated and the system may be partitioned by domain (customer) with specific access to types of system resources with specific access rights. A user is thus partitioned by domain but not partitioned for specific access by customer and by cable station.

A system partition configuration file may be generated for the NMS 204 and stored as the partition mapping table 232. Generation of the system partition configuration file can include defining one or more rules that establish the specific equipment each customer can access, and the access rights for that equipment. Rule generation can further include defining what equipment a domain is allowed to access based on identifying one or more cable landing stations, fiber optic cables, fiber pairs, channel wavelengths, and/or specific equipment. The system partition configuration file may manifest as a XML description that allows for robust and full partitioning by domain and by resource. The partition configuration file may be system-specific and replicated such that the user interface 224 can access the same regardless of where the partitioning server function is instantiated/executed in the system.

Figure 3:
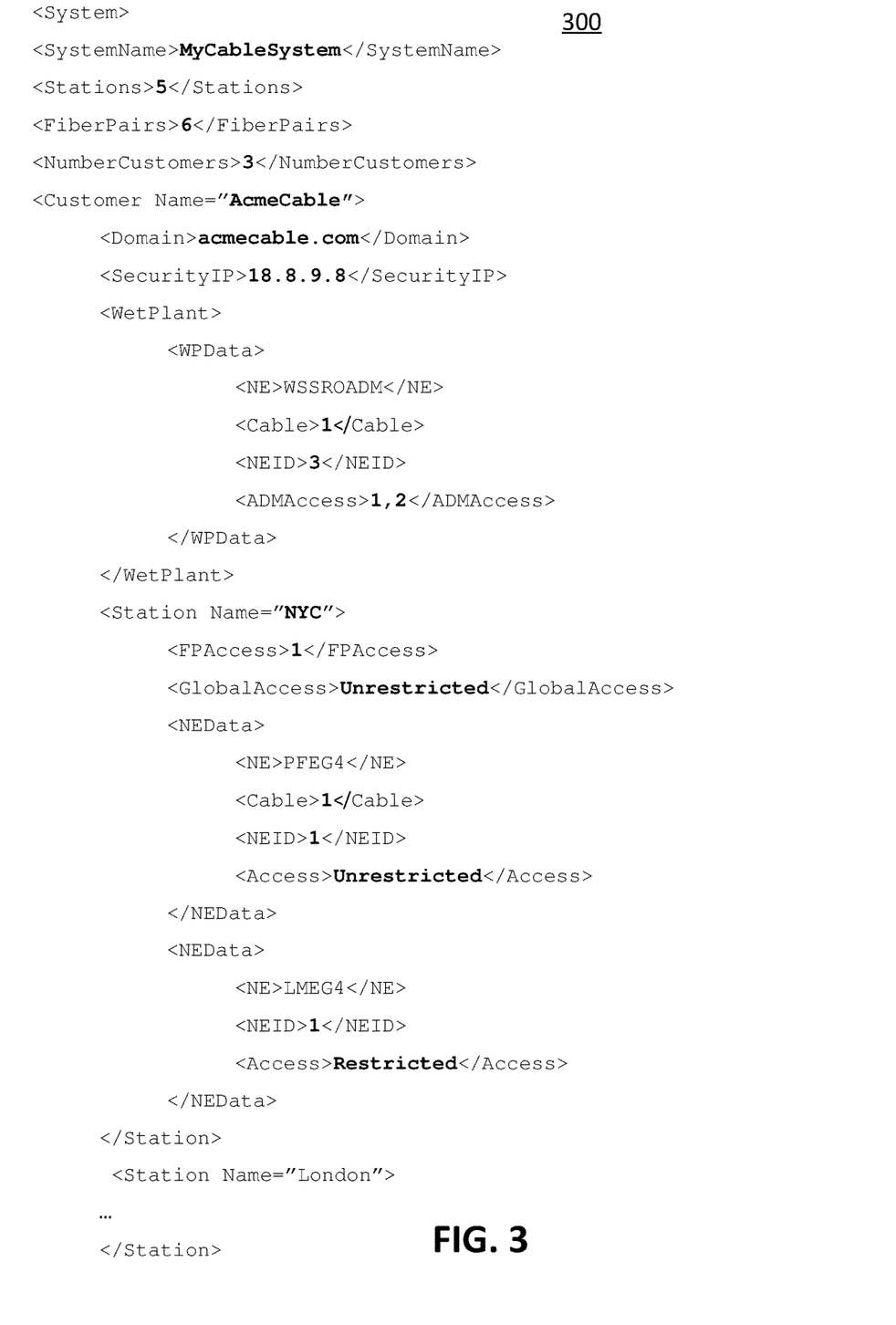
FIG. 3 is an example of a system partitioning configuration file consistent with an embodiment of the present disclosure.

One such example XML configuration file 300 suitable for use within the partition mapping table 232 is shown in FIG. 3. As shown, the partitioning definition file 300 is hierarchical and broken up into sections. Each shown section will be discussed in turn but is not intended to be limiting. System level information can include, for example, system name, number of cable stations, number of fiber pairs, and number of customers/domains. Customer centric information can include, for example, partitioning information that pertains to users logged in directly or indirectly (e.g., via an API) of that customer type. Such information can define Wet Plant access for that user entity by cable and fiber pair (e.g., WSS ROADM #3, on cable #1, accessing ADMs #1 and #2 in the <Wet Plant> Section). Further, the information can define Station partitioning access for that user entity such as in the NYC cable station shown in FIG. 3. The stationing partitioning access definition can further define what fiber pairs in the cable station the user entity can access, e.g., fiber pair number 1 in the example below; define specific network element number (NE) access in that cable station for that user entity, e.g., NYC cable station, PFE #1 on cable #1 with unrestricted access (access may be determined by the user's normal access rights in this case); and LME #1 with Restricted access (e.g., a user of restricted type cannot access the LMS in this case). In some cases, the definition file can go as fine-grain as the wavelength or band level in an undersea ROADM, for instance, if desired.

Secured Partitioning NMS (SP-NMS) Access Patterns and Methodology

As discussed above, the NMS 204 can include a security manager 220 that may be disposed between the user interface 224 and the NMS 204. The user interface 224 may implement a ReST API or a user interface for direct access, although other architectures are within the scope of this disclosure. The security manager 220 may intercept requests made through the user interface 224 and can validate the request. In the context of authentication, e.g., during login, the security manager 220 may communicate with a remote authenticator, e.g., remote authenticators 214, via the authentication interface. The response from a given authenticator may then be communicated back to a user 229, e.g., in the form of an acknowledgement (ACK) or negative acknowledgement (NAK).

The security manager 220 may also cache in a memory the user access attributes received from an authenticator. The security manager 220 may also access the partitioning configuration file within the partition mapping table 232, as discussed above, and cache the same in the memory 207. Utilizing the user access attributes and the partitioning configuration file, the security manager 220 can generate an access token 242 (which may be stored in the memory 207) that includes information that allows the user 229 to make subsequent requests in a secure partitioned manner. The access token 242 may be implemented as, for instance, a ALG_HS512 encrypted JavaScript Object Notation (JSON) Web Token (JWT). The access token 242 may include a value representing the user's domain, and the user 229 may provide the access token 242 (or a representation thereof) when sending requests via the user interface 224. The access token 242 may further include an expiration value that causes the security manager to invalidate the access token after a predetermined period of time, e.g., based on a timer. In the event an access token expires, the user 229 may re-establish the session through a re-authentication procedure, e.g., re-logging in.

Continuing on, the security manager 220 can validate all requests to the NMS 204 for system resources, and management data such as alarms, performance data, control operations, and so on. To validate requests, the security manager 220 may validate the access token against a currently cached data within the memory 207 that provides an authentication record and resource authorization information. For each request, the security interface 220 may then examine the partitioning assigned to a given domain/user and will either validate (e.g., allow) access to the associated station and resource(s) being requested, or alternatively, disallow the request (e.g., based on user, domain, and/or associated partitioning attributes). In the event the request is validated, the security manager 220 may then allow the request to be satisfied by, for instance, the NMS 204 sending back requested topology information and/or requested management data.

Requests may be handled via a user interface local to the NMS 204 and/or an external API network management operation request to/from the NMS 204, that in turn validates all requests on a per-user or per-customer domain basis, as discussed above. In the case of the client GUI, the NMS 204 can display an un-partitioned system which can display all resources/equipment available in a system. From the perspective of the user 229, the partitioning scheme of the NMS 204 as controlled by the security manager 220 appears to be transparent. Stated differently, the user sends requests via the user interface 224, with those requests being validated by the security manager 220 or not, as the case may be. The user 229 thus has access to equipment that is assigned to their particular customer domain.

In an embodiment, and in the context of a partitioned system, after successful login or API requests for user validation, the NMS 204 can return the token 242, which the client or API can cache and supply with every network management request. On receiving a client request, for example for access system level information, the NMS 204 may return only information related to the cable and fiber pair (or channel wavelength) which the calling entity has access to. The GUI may then only display cable, fiber pair and related network element resources based on the partitioned information it gets from the NMS 204, i.e., the topology information.

For example, if the user/client 229 request is from a user that only has access to fiber pair #1, the NMS 204 may only return information related to that configuration in the CORBA message that uses an Interface Definition Language (IDL) data structure to define partitioning access. The client may then read this IDL definition and dynamically "learn" what features/entities of the system are available on the GUI. From that point, the user can initiate further system management operations based on their defined access rights to the available resources (View or Control).

The NMS 204 may include a ReST API that can work in a similar fashion. After the API makes a call to validate a given user, the token, e.g., token 242, may be returned in the API call and that token can be passed with all future ReST calls otherwise the call may be rejected by the NMS 204. Partitioned information in the JavaScript Object Notation (JSON) format can be passed back to the user for only those resources that calling entity can access for GET operations. ReST Control operations (PUT, POST and DELETE) may be only allowed if the calling entity has control access to the requested resources.

Figure 4:
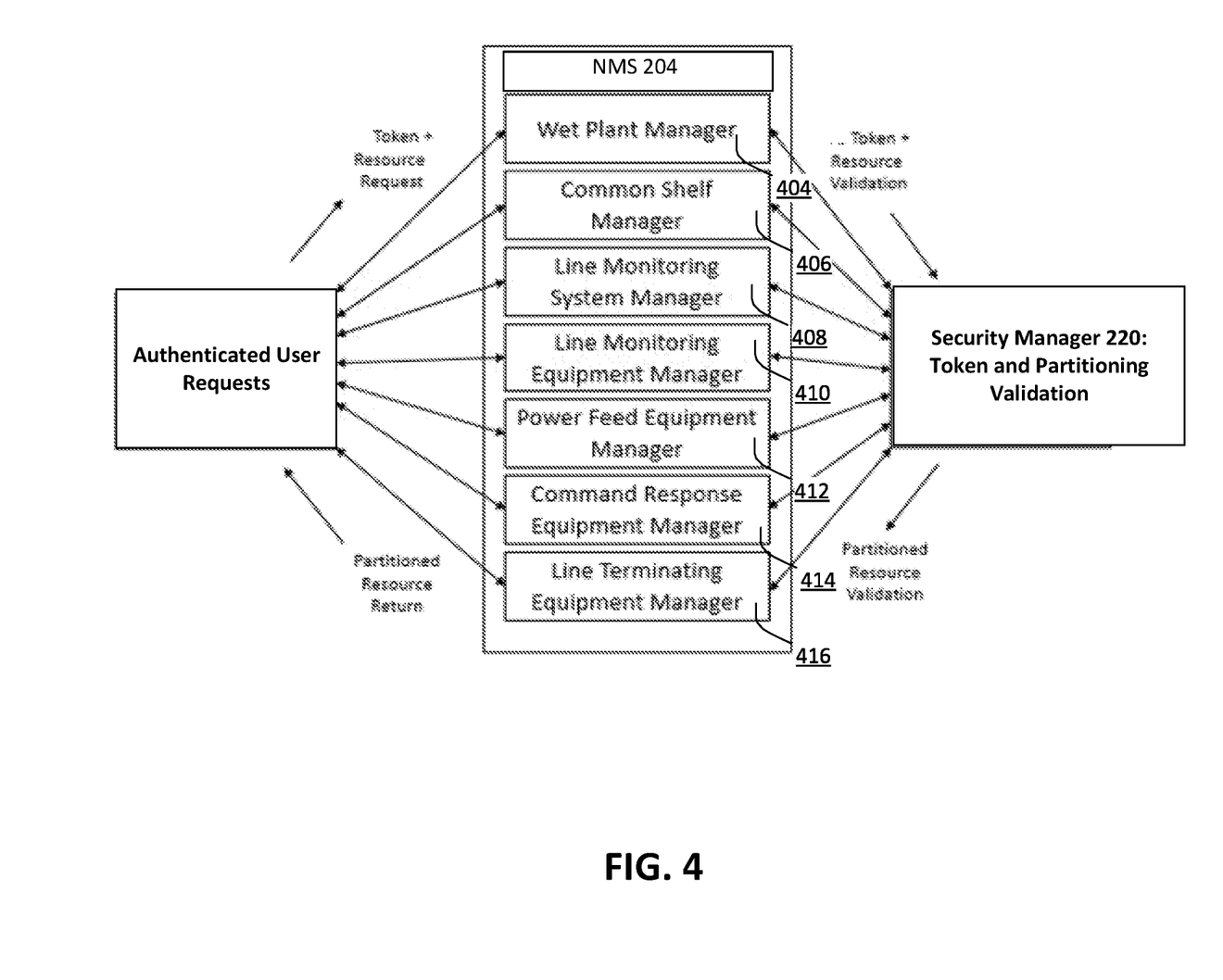
FIG. 4 is a simplified block diagram of an example NMS architecture consistent with the present disclosure.

Continuing on, in an embodiment, the NMS 204 can include a plurality of server components for servicing of requests for different aspects of the optical communication system. FIG. 4 shows a plurality of example server components for servicing user requests. As shown in FIG. 4, the server modules include a wet plant manager 404, a common shelf manager 406, a line monitoring system manager 408, a line monitoring equipment manager 410, a power feed equipment manager 412, a command response equipment manager 414, and a line terminating equipment manager 416. Each will now be discussed in turn, but the particular server component examples discussed below are not exhaustive and other embodiments are within the scope of this disclosure.

The wet plant manager 404 can manage requests for resources and configuration related to wet Plant equipment such as Power Switched Branching Units (PSBUs), Dispersion Compensation Units (DCUs), Switched Wavelength Multiplexing Units (sWMUs) and WSS ROADMS. The common shelf manager 406 can manage requests for resources related to the Line Terminating Equipment Shelf. The LMS manager 408 can handle resources related to the Line Management System and related data interfaces such as High Loss Loopback (HLLB) data, Optical Spectrum Monitoring (OSM) data, and Optical Time Domain Reflectometer (OTDR) data. Line Monitoring Equipment manager 410 can manage requests for Line Monitoring Hardware specific resources such as port configuration, board temperature and operational status. The PFE manager 412 can manage requests for Power Feed Equipment data such as hardware configuration and voltage and current data for the system. The LTE manager 416 can manage requests for configuration and resources related to all other Line Terminating equipment such as Dry ROADMs, Internal Loading Equipment (ILE), and Terminal Line Amplifiers (TLAs). The Command Response Equipment manager 414 can manage requests for configuration and operation of the Command Response Equipment (CRE) used to communicate with the Wet Plant devices.

Figure 5:
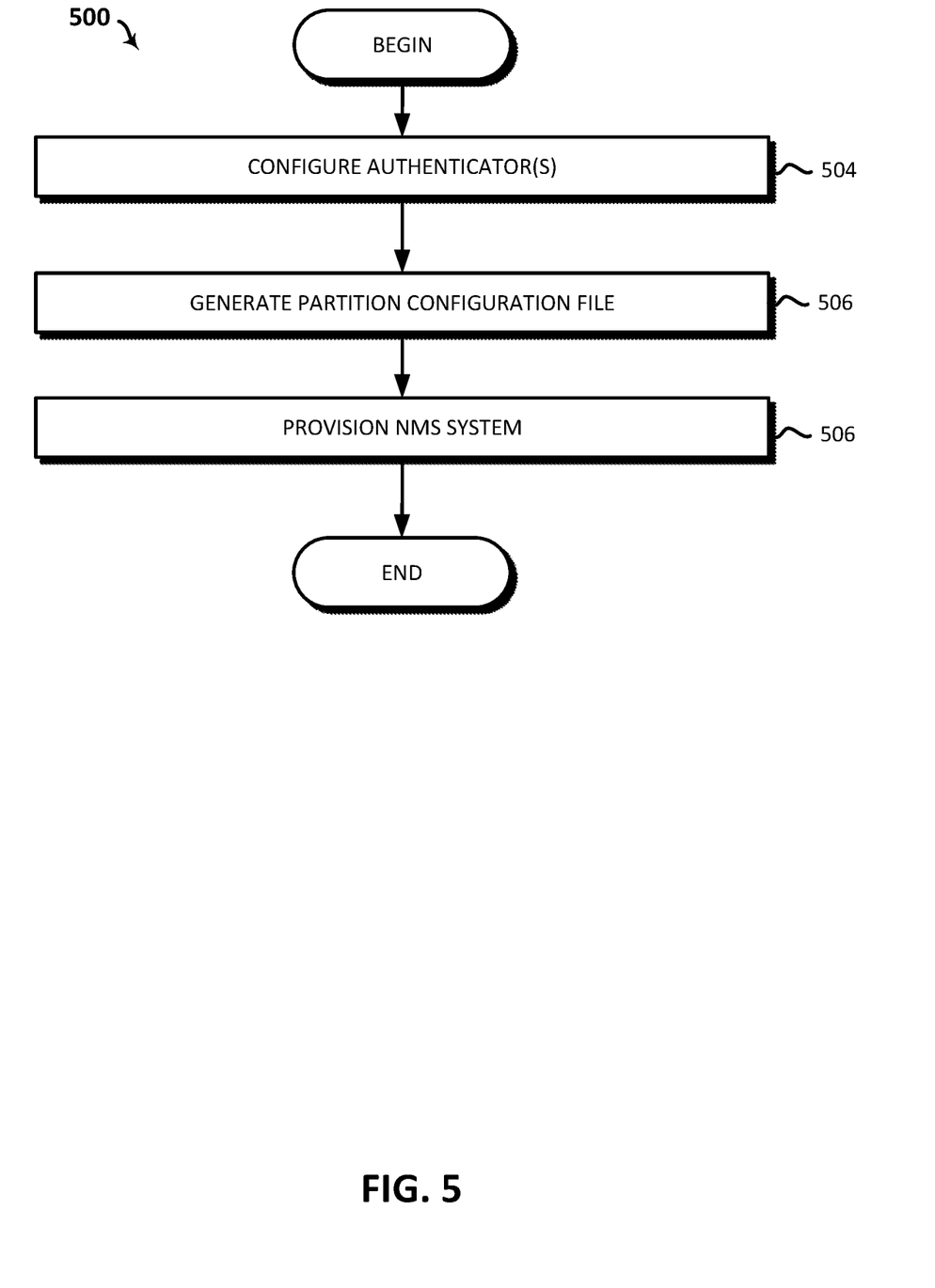
FIG. 5 shows an example method for provisioning an optical communication system to provide secured partitioning in accordance with an embodiment of the present disclosure.

Aspects and embodiments of the foregoing may be implemented in one or more processes executable by a controller of an NMS system consistent with the present disclosure, e.g., the controller 205 of FIG. 2. FIG. 5 shows one such process 500 for configuration of an NMS system consistent with the present disclosure.

The process 500 includes acts of configuring authenticators, a partitioning configuration file, and provisioning the NMS system. In act 504, the process 500 includes configuring authenticator(s). Configuration of authenticators, e.g., remote authenticators 214, may include configuring one or more remote computer systems to handle remote authorization requests using, for instance, a AAA protocol. Configuration of the authenticators may further include deploying a common database schema that allows for users and associated access attributes to be stored, e.g., as discussed above with regard to Table 1, and retrieved in a common format.

In act 506, the process 500 further includes generating a partition configuration file such as the partition configuration XML file shown and discussed above with reference to FIG. 3. The partition configuration may establish a plurality of domains, associated equipment, and access rules/properties. Access for each customer domain may be relatively fine-grain and may include definitions to limit access to equipment associated with one or more cable landing stations, optical cables, optical fiber pairs, channel wavelengths, or any combination thereof.

In act 506, the process 500 further includes provisioning an NMS system, e.g., the NMS 204. Provisioning the NMS system can include adding entries in the network elements table 230, with each entry defining equipment-centric details such as the type of equipment, IP address, cable landing station, optical fiber identifier, fiber pair(s), and/or associated channel wavelength(s). Act 506 may further include adding entries in the partition mapping table 232 to establish associations between domains and equipment within the network elements table.

Figure 6:
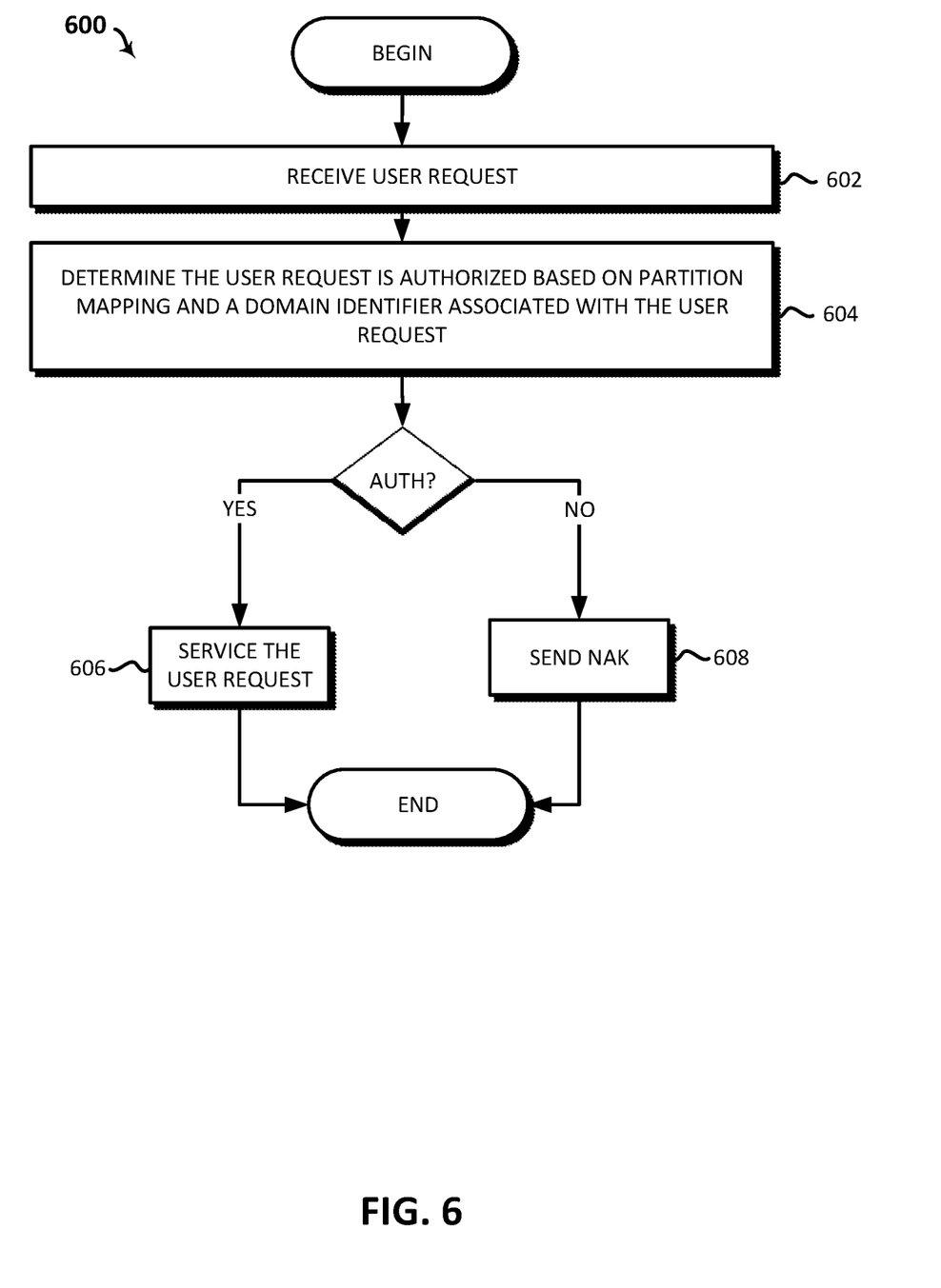
FIG. 6 shows an example method for servicing user requests within an optical communication system implementing secured partitioning in accordance with an embodiment of the present disclosure.

FIG. 6 shows another example embodiment of a process 600 for servicing user requests by an NMS consistent with the present disclosure. In act 602, a user request is received by the NMS, the user request may identify an operation to perform and include an equipment identifier for the operation. The user request may further include a domain identifier associated with the user, with the domain identifier corresponding to a domain identifier provisioned in the NMS.

In act 604, the NMS determines if the user request is authorized based at least in part on the partition mapping table 232 and the domain identifier associated with the user request. In an embodiment, the NMS examines the partition mapping table 232 and the network element table 230 to determine what equipment a user can access based on their respective domain. As discussed above, domains may be associated with one or more cable landing stations, fiber cables, fiber optic pairs, and/or channel wavelengths. Thus, the NMS may allow or disallow access to equipment based on a user's domain and the associations defined for the same. In some cases, the NMS generates a token to allow for repeated requests by the user to be validated without having to re-examine the partition mapping and network element tables. Therefore, subsequent user requests may be serviced based on the token file without performing database operations to determine if a user should have access to requested equipment, or not, as the case may be.

In response to user request being authenticated, the NMS may then service the request in act 606. Servicing of the user request may include, for instance, sending a message with topology information, log data for a target element, and/or adjusting an operational setting of a network element. On the other hand, the NMS may send a negative acknowledgement (NAK) in act 608 in the event the request is not authorized. The NAK message may include an error code or other data, e.g., a character string, to indicate why the user request failed.

In accordance with an aspect of the present disclosure a system for managing an optical communication system is disclosed. The optical communication system having an optical transmission path disposed between at least two cable landing stations and a plurality of network elements disposed along the optical transmission path, the system comprising a network element table, the network element table defining a plurality of network element definitions that each represent a different network element of the optical communication system, a partition mapping table to associate each of the plurality of network element definitions with at least one domain identifier based at least in part on a fiber pair and/or channel wavelength assigned to each network element, a network management system (NMS) controller to receive a user request to access a network element from a user, the user request being associated with a first domain identifier and including an identifier of an operation to perform, determine the user request is authorized to access the network element based on the partition mapping table indicating that the first domain identifier is associated with the network element of the user request, and in response to determining the user request is authorized, performing the operation.

In accordance with another aspect of the present disclosure a computer-implemented method for managing an optical communication system having an optical transmission path disposed between at least two cable landing stations and a plurality of network elements disposed along the optical transmission path is disclosed. The method comprising receiving, by a controller, a user request to access a network element of the plurality of network elements from a user, the user request being associated with a first domain identifier and including an identifier of an operation to perform, and determine, by the controller, the user request is authorized to access the network element based on a partition mapping table indicating that the first domain identifier is associated with the network element of the user request, and in response to determining the user request is authorized, performing the operation.

In accordance with another aspect of the present disclosure an optical system is disclosed. The optical system comprising an optical transmission path disposed between at least a first and second cable landing stations, a plurality of undersea optical components coupled to the optical transmission path, a network management system (NMS) controller to receive a user request to access an undersea optical component, the user request being associated with a first domain identifier and including an identifier of an operation to perform, determine the user request is authorized to access the undersea optical component based on a partition mapping table indicating that the first domain identifier is associated with the undersea optical component of the user request, and in response to determining the user request is authorized, performing the operation.

The foregoing description of example embodiments has been presented for the purposes of illustration and description. It is not intended to be exhaustive or to limit the present disclosure to the precise forms disclosed. Many modifications and variations are possible in light of this disclosure.

It is intended that the scope of the present disclosure be limited not by this detailed description, but rather by the claims appended hereto.

Embodiments of the methods described herein may be implemented using a controller, processor and/or other programmable device. To that end, the methods described herein may be implemented on a tangible, non-transitory computer readable medium having instructions stored thereon that when executed by one or more processors perform the methods.

Thus, for example, the NMS 204 may include a storage medium to store instructions (in, for example, firmware or software) to perform the operations described herein. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processor", may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having"

are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A system for managing an optical communication system having an optical transmission path disposed between at least two cable landing stations and a plurality of network elements disposed along the optical transmission path, the system comprising:
   a network element table, the network element table defining a plurality of network element definitions that each represent a different network element of the optical communication system;
   a partition mapping table, the partition mapping table associating each of the plurality of network element definitions with at least one domain identifier corresponding to a customer domain,
   a network management system (NMS) controller to:
   receive a user request to access a network element from a user, the user request being associated with a first domain identifier and including an identifier of an operation to perform;
   determine the user request is authorized to access the network element based on the partition mapping table indicating that the first domain identifier is associated with the network element of the user request; and
   in response to determining the user request is authorized, performing the operation, and
   wherein the partition mapping table includes a hierarchal structure that associates a plurality of customer domains with cable landing stations of the optical communication system.

2. The system of claim 1, further comprising a plurality of authenticator servers for storing a plurality of user access credentials and associated user access attributes, and wherein the NMS includes an authentication interface to communicate with the plurality of authenticator servers to validate user credentials received within the user request.

3. The system of claim 2, wherein each of the plurality of authenticator servers is associated with a different domain identifier.

4. The system of claim 2, wherein each of the plurality of the authenticator servers implement an Authentication, Authorization, and Accounting (AAA) protocol to receive authentication requests from the NMS controller.

5. The system of claim 2, wherein the user access attributes define a first type of equipment a user has access to and one or more privileges for accessing the first type of equipment.

6. The system of claim 1, wherein the partition mapping table includes at least one partition mapping configuration file, the at least one partition mapping configuration file defining a plurality of rules that associate each domain identifier with one or more cable landing stations, and equipment access rights for network elements associated with each cable landing station.

7. The system of claim 1, wherein the NMS controller generates an access token in a memory in response to determining the user request is authorized, the access token to allow the NMS controller to validate subsequent user requests without accessing the partition mapping table and/or the network element table.

8. The system of claim 1, wherein the partition mapping table and the network element table are distributed across a plurality of NMS server computers disposed in different cable landing stations.

9. The system of claim 1, wherein the operation identifier within the user request comprises at least one of a request to retrieve log data from the network element and/or adjust a setting of the network element.

10. The system of claim 1, wherein the NMS controller is configured to send a negative acknowledgement (NAK) to the user in response to a user request that attempts to perform an operation on equipment not assigned or restricted to the user based on the partition mapping table and a domain identifier associated with the user request.

11. The system of claim 1, wherein the plurality of network elements are undersea network elements, the undersea network elements including at least one of an optical repeater, branching unit, and/or optical equalizer.

12. The system of claim 1, wherein the network element table is generated from element management system (EMS) data from at least each of the at least two cable landing stations of the optical communication system.

13. The system of claim 1, wherein the partition mapping table defines associations between (i) the plurality of customer domains and (ii) system components, the system components including at least equipment or the network elements, optical cables, fiber pairs, and channel wavelengths corresponding to the optical communication system.

14. A computer-implemented method for managing an optical communication system having an optical transmission path disposed between at least two cable landing stations and a plurality of network elements disposed along the optical transmission path, the method comprising:
   receiving, by a controller, a user request to access a network element of the plurality of network elements from a user, the user request being associated with a first domain identifier and including an identifier of an operation to perform;
   determining, by the controller, the user request is authorized to access the network element based on a partition mapping table indicating that the first domain identifier is associated with the network element of the user request; and
   in response to determining the user request is authorized, performing the operation,
   wherein the partition mapping table includes a hierarchal structure that associates a plurality of customer domains with cable landing stations of the optical communication system.

15. The computer-implemented method of claim 14, further comprising sending a message with topology information to a user device to cause a graphical user interface (GUI) of the user device to visually depict the topology information.

16. The computer-implemented method of claim 14, wherein in response to determining the user request is not authorized, sending a negative acknowledgment to the user.

17. The computer-implemented method of claim 14, further comprising generating the partition mapping table, the partition mapping table associating each domain with one or more authorized cable landing stations and authorized equipment within each cable landing station.

18. An optical communication system, comprising:
   an optical transmission path disposed between at least a first and second cable landing stations;

a plurality of undersea optical components coupled to the optical transmission path;

a network management system (NMS) controller to:
receive a user request to access an undersea optical component, the user request being associated with a first domain identifier and including an identifier of an operation to perform;

determine the user request is authorized to access the undersea optical component based on a partition mapping table indicating that the first domain identifier is associated with the undersea optical component of the user request; and in response to determining the user request is authorized, performing the operation, and wherein the partition mapping table includes a hierarchal structure that associates a plurality of customer domains with cable landing stations of the optical communication system.

\* \* \* \* \*